(12) United States Patent
Liu

(10) Patent No.: US 11,236,920 B2
(45) Date of Patent: Feb. 1, 2022

(54) SYSTEM AND METHOD FOR COMMISSIONING FRESH AIR INTAKE CONTROL

(71) Applicant: Siemens Industry, Inc., Alpharetta, GA (US)

(72) Inventor: Jibo Liu, Long Grove, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 63 days.

(21) Appl. No.: 16/891,505

(22) Filed: Jun. 3, 2020

(65) Prior Publication Data
US 2021/0381709 A1 Dec. 9, 2021

(51) Int. Cl.
| | |
|---|---|
| *F24F 11/64* | (2018.01) |
| *F24F 11/46* | (2018.01) |
| *F24F 7/013* | (2006.01) |
| *F24F 11/65* | (2018.01) |
| *F24F 11/77* | (2018.01) |
| *G05B 19/042* | (2006.01) |

(Continued)

(52) U.S. Cl.
CPC .............. *F24F 11/46* (2018.01); *F24F 7/013* (2013.01); *F24F 11/0001* (2013.01); *F24F 11/64* (2018.01); *F24F 11/65* (2018.01); *F24F 11/77* (2018.01); *G05B 19/042* (2013.01); *F24F 13/10* (2013.01); *F24F 2007/001* (2013.01); *F24F 2011/0002* (2013.01); *F24F 2011/0006* (2013.01); *F24F 2110/10* (2018.01); *F24F 2110/12* (2018.01); *F24F 2110/40* (2018.01); *F24F 2140/60* (2018.01); *G05B 2219/2614* (2013.01)

(58) Field of Classification Search
None
See application file for complete search history.

(56) References Cited

U.S. PATENT DOCUMENTS

| | | |
|---|---|---|
| 3,979,922 A | 9/1976 | Shavit |
| 4,182,180 A | 1/1980 | Mott |

(Continued)

FOREIGN PATENT DOCUMENTS

| | | |
|---|---|---|
| CA | 2818631 | 9/2014 |
| EP | 0721087 | 7/1996 |

(Continued)

OTHER PUBLICATIONS

Econ-Zip-Self; Zip Pack Instruction Manual, Belimo Aircontrols, (USA), Inc., Mar. 2015, 6 pages.

(Continued)

*Primary Examiner* — Bernard G Lindsay (57) ABSTRACT

There is described a mobile device and method for commissioning air intake control of an environmental control system. A communication component receives multiple air measurements from an air flow sensor, in which the air flow sensor is positioned in a duct compartment of the environmental control system. The processor generates multiple air flow tables based on the multiple air measurements, multiple fan speeds associated with the environmental control system, and multiple damper positions associated with the environmental control system. The communication component transmits the multiple air flow tables to an air intake controller of the environmental control system.

17 Claims, 6 Drawing Sheets

(51) Int. Cl.
*F24F 11/00* (2018.01)
*F24F 7/00* (2021.01)
*F24F 110/10* (2018.01)
*F24F 110/12* (2018.01)
*F24F 13/10* (2006.01)
*F24F 110/40* (2018.01)
*F24F 140/60* (2018.01)

(56) References Cited

U.S. PATENT DOCUMENTS

| | | | |
|---|---|---|---|
| 4,347,712 | A | 9/1982 | Benton et al. |
| 4,570,448 | A | 2/1986 | Smith |
| 5,762,420 | A | 6/1998 | Mills |
| 6,161,764 | A | 12/2000 | Jatnicks |
| 6,415,617 | B1 | 7/2002 | Seem |
| 6,428,608 | B1 | 8/2002 | Shah et al. |
| 6,514,138 | B2 | 2/2003 | Estepp |
| 6,623,550 | B2 | 9/2003 | Shah et al. |
| 6,826,920 | B2 | 12/2004 | Wacker |
| 6,916,239 | B2 | 7/2005 | Siddaramanna et al. |
| 7,331,852 | B2 | 2/2008 | Ezell et al. |
| 7,434,413 | B2 | 10/2008 | Wruck |
| 7,565,813 | B2 | 7/2009 | Pouchak |
| 7,770,543 | B2 | 8/2010 | Havlena et al. |
| 7,898,147 | B2 | 3/2011 | Grabinger et al. |
| 8,042,352 | B2 | 10/2011 | Deangelis |
| 8,147,302 | B2 | 4/2012 | Desrochers et al. |
| 8,195,335 | B2 | 6/2012 | Kreft et al. |
| 8,364,318 | B2 | 1/2013 | Grabinger et al. |
| 8,560,126 | B2 | 10/2013 | Vass et al. |
| 9,746,199 | B1 | 8/2017 | Drees et al. |
| 10,528,065 | B1 | 1/2020 | Sidhom |
| 2003/0078677 | A1 | 4/2003 | Hull et al. |
| 2006/0105760 | A1 | 5/2006 | Shamoon et al. |
| 2006/0234621 | A1 | 10/2006 | Desrochers et al. |
| 2008/0283033 | A1* | 11/2008 | Michaud ............ F24H 9/2071 126/110 A |
| 2010/0251150 | A1 | 9/2010 | Walter et al. |
| 2011/0131995 | A1 | 6/2011 | Havlena |
| 2011/0168793 | A1 | 7/2011 | Kreft et al. |
| 2011/0264273 | A1 | 10/2011 | Grabinger et al. |
| 2011/0264275 | A1 | 10/2011 | Thomle et al. |
| 2011/0264280 | A1 | 10/2011 | Grabinger et al. |
| 2012/0078563 | A1 | 3/2012 | Grabinger et al. |
| 2012/0079425 | A1 | 3/2012 | Grabinger et al. |
| 2012/0245968 | A1 | 9/2012 | Beaulieu et al. |
| 2012/0283880 | A1 | 11/2012 | Kreft et al. |
| 2016/0085248 | A1* | 3/2016 | Gordon ............ G05D 23/1932 700/276 |
| 2016/0291606 | A1 | 10/2016 | Someya et al. |
| 2017/0016642 | A1* | 1/2017 | Spalink ................ F24F 11/62 |
| 2017/0314800 | A1* | 11/2017 | Bengea ................ F24F 11/30 |
| 2019/0170375 | A1* | 6/2019 | Poerschke ........... F24F 13/105 |
| 2019/0346170 | A1* | 11/2019 | Benefield ............. H04W 4/33 |
| 2020/0141606 | A1* | 5/2020 | Tournier ............. F04D 27/001 |
| 2020/0359532 | A1* | 11/2020 | VanGilder ......... H05K 7/20209 |

FOREIGN PATENT DOCUMENTS

| | | |
|---|---|---|
| WO | 2002063294 | 8/2002 |
| WO | 2014164788 | 10/2014 |

OTHER PUBLICATIONS

Energy Star, Air-Side Economizer Products, downloaded from the internet https://www.energystar.gov/products/low_carbon_it_campaign/12_ways_save_energy_data_center/air_side_economizer, May 18, 2020, 4 pages.

PCT Search Report dated Jul. 30, 2021, for PCT Application No. PCT/US2021/031205, 15 pages.

* cited by examiner

SYSTEM AND METHOD FOR COMMISSIONING FRESH AIR INTAKE CONTROL

FIELD OF THE INVENTION

This application relates to the field of building management systems and, more particularly, to environmental controls for fresh air intake components.

BACKGROUND

Figure 1:
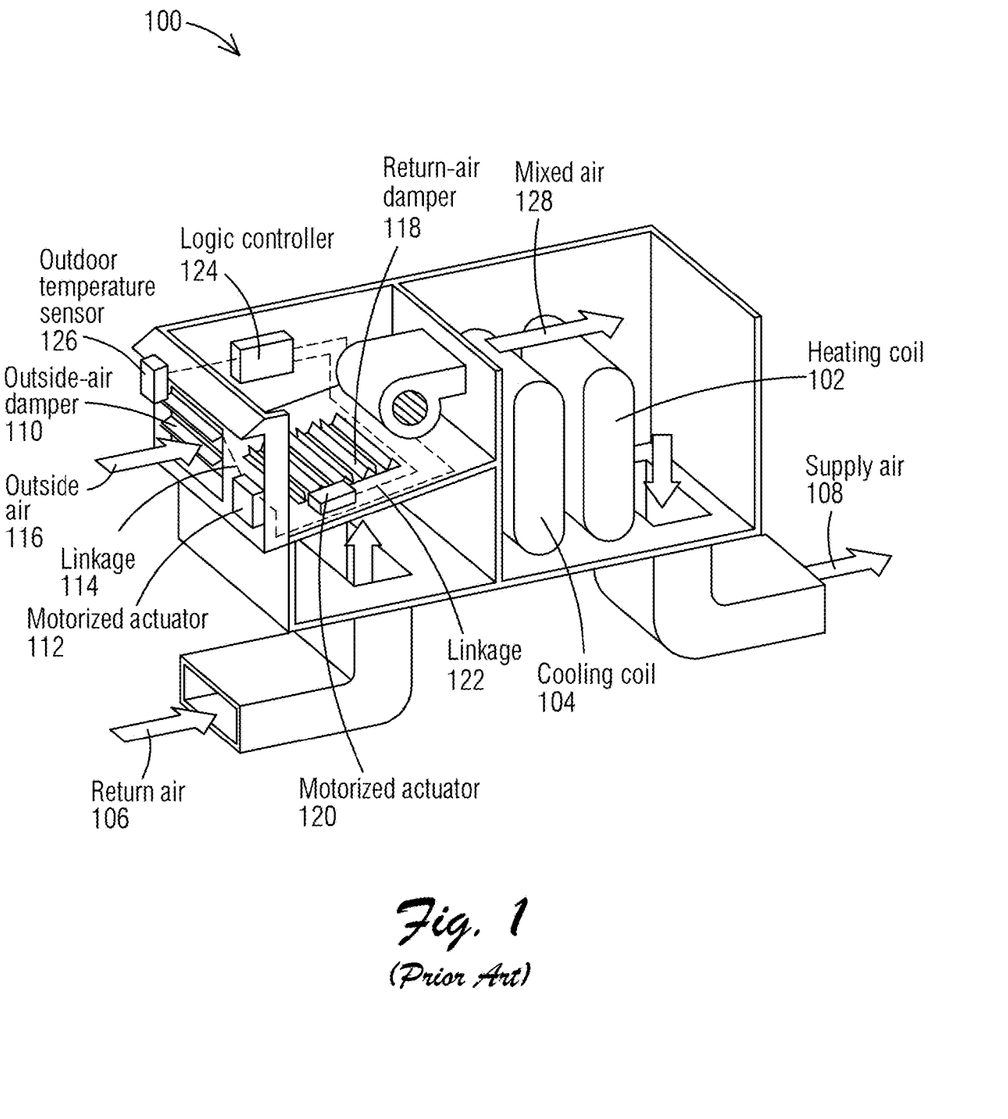
FIG. 1 is a partial perspective view of a prior art air-side economizer.

An environmental control system of a building manages heating, ventilation, and air conditioning (HVAC) components to manage environmental conditions within the building. The system may include an economizer may allow fresh air external to the building to circulate through the HVAC components and cool the environmental conditions of the building in an efficient manner. Referring to FIG. 1, there is shown a prior art air-side economizer 100 published by the U.S. Department of Energy as a representative Energy Star product. The HVAC components of the conventional economizer 100 include heating and/or cooling coils 102, 104 that modify, if necessary, the temperature of return air 106 to generate supply air 108 for the building. The economizer includes an outside air damper 110 controlled by an outside motorized actuator 112 via an outside linkage 114 to manage the amount of outside air 116 entering the system and a return air damper 118 controlled by a return motorized actuator 120 via a return linkage 122 to manage the amount of return air 106 continuing through the system. A logic controller 124 of the economizer controls the outside and return motorized actuators 112, 120 based on an outside temperature sensor 126 to manage the mixed air 128, i.e., mixture of outside air and return air, circulated through the system.

Although economizers have the potential to save substantial energy for maintenance of buildings, many existing economizers fail to provide significant cost savings. At least part of the problem may be attributed to the difficulty in configuring an economizer before installation at an intended environmental control system, such as a factory where the economizer is manufactured. Factory commissioning is possible, but the accuracy of the economizer may be compromised due to the varying possible configurations of the HVAC components and lack of customization and testing capabilities during an actual installation. Specialized components and services, such as dampers modulated by carbon dioxide sensors and professional technicians creating air balancing reports, may help to improve the accuracy of the economizer on-site but require more space and significant cost. Also, a multi-speed fan of the environmental control system may require the commissioning procedure to perform multiple iterations (at least one per fan speed) which adds further costs when implementing these specialized components and services.

SUMMARY

In accordance with some embodiments of the disclosure, there is provided a field commissioning approach for fresh air intake control of an environmental control system. In particular, a mobile device generates tables for air flow corresponding to air flow factors, including various fan speeds and damper positions, by controlling actuators to drive air flow, receiving actuator feedback signals, and acquiring air flow signals from an air flow sensor. There are several advantages of using a mobile device to generate the controller-stored tables for commissioning air intake control. An air flow sensor may be wired or connected wirelessly to either mobile device or the controller. Thus, the air flow sensor is only needed during commissioning of the environmental control system for temporary placement in the field, thereby reducing the financial burden of a building owner to purchase and maintain such equipment. Also, the air flow balancing process and damper position calibration are automated, thus minimizing the manual labor of a technician to install and/or service the system. The mobile device further provides an intuitive visualization and transparency for the commissioning process, such as display results and status for the technician, and commissioning data may be archived at, or transferred to or from, local or remote locations.

One aspect is a mobile device for commissioning air intake control of an environmental control system comprising a communication component and a processor. The communication component is configured to receive multiple air measurements from an air flow sensor. The air flow sensor is positioned in a duct compartment of the environmental control system. The processor is configured to generate multiple air flow tables based on the multiple air measurements, multiple fan speeds associated with the environmental control system, and multiple damper positions associated with the environmental control system. The communication component transmits the multiple air flow tables to the air intake controller of the environmental control system.

Other aspects include a method for commissioning air intake control of an environmental control system and a non-transitory computer readable medium including executable instructions which, when executed, causes at least one processor to commission air intake control of an environmental control system. The mobile device receives multiple air measurements from an air flow sensor positioned in a duct compartment of the environmental control system. The mobile device generates multiple air flow tables based on the multiple air measurements provided by the air flow sensor, multiple fan speeds associated with the environmental control system, and multiple damper positions associated with the environmental control system. The mobile device transmits the multiple air flow tables to the air intake controller of the environmental control system.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

A mobile device or other type of commissioning device may be used to generate tables for air flow by controlling actuators to drive air flow, receiving actuator feedback signals, and acquiring air flow signals from an air flow sensor. The mobile device may manage air flow by controlling various air flow factors such as fan speed and damper position. Various technologies that pertain to systems and methods that facilitate commissioning of fresh air intake control will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 2:
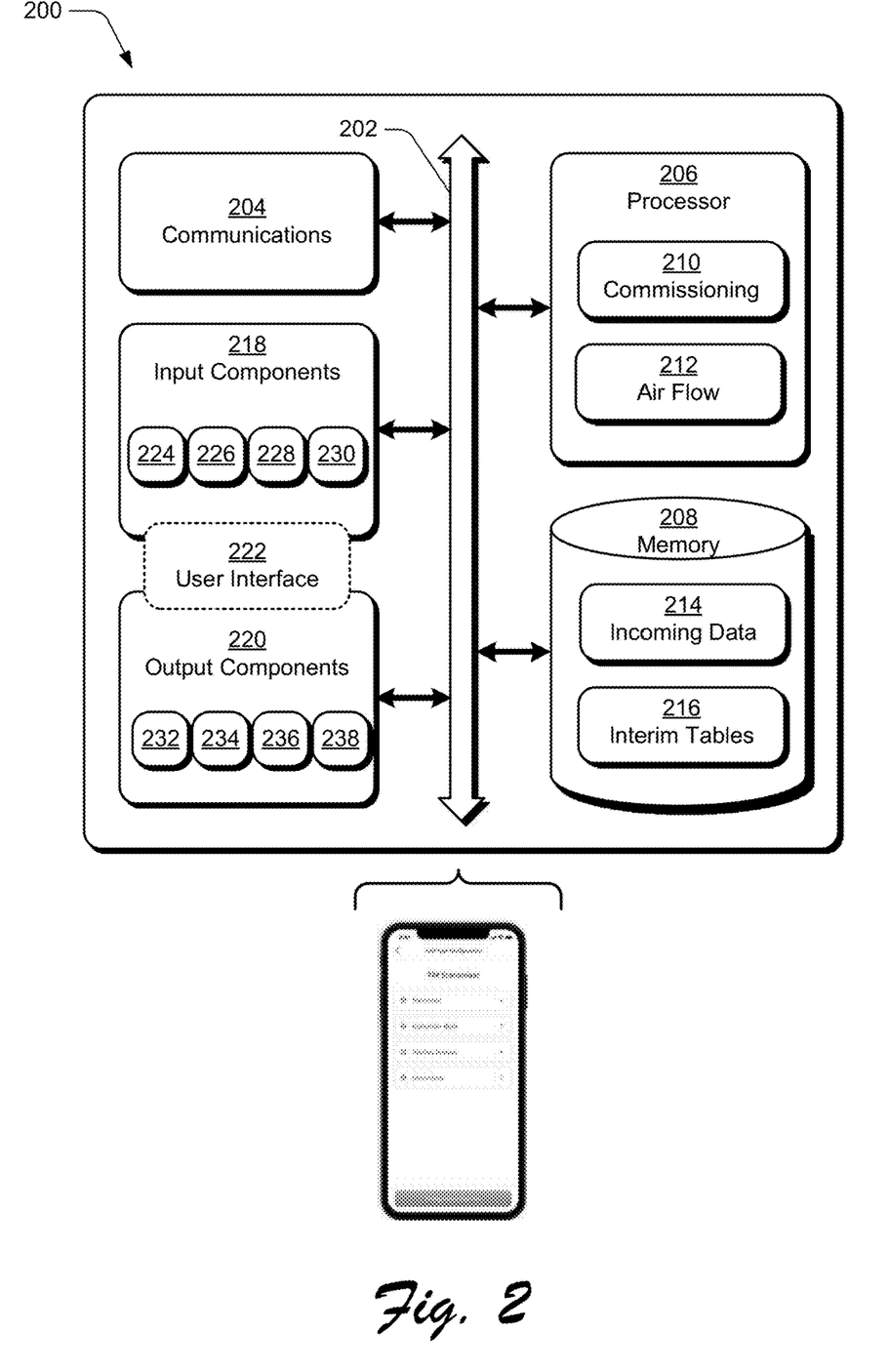
FIG. 2 is a block diagram of a mobile device in an example implementation that is operable to employ the techniques described herein.

FIG. 2 represents an example mobile device 200 of an environmental control system. The mobile device 200 may be any type of commissioning device that may generate tables for air flow of the system and communicate the tables to a control device for storage and utilization. Examples of mobile devices 200 include, but are not limited to, smartphones, wearables, tablets, handheld computing devices, notebook/laptop computers, and the like. The mobile device 200 comprises a communication bus 202 for interconnecting the other device components directly or indirectly, one or more communication components 204 communicating other entities via a wired and/or wireless network, one or more processors 206, and one or more memory components 208.

The communication component 204 may utilize wireless technology for communication, such as, but are not limited to, cellular-based communications, Bluetooth (including BLE), ultrawide band (UWB), Wi-Fi (including Wi-Fi Direct), IEEE 802.15.4, Z-Wave, 6LoWPAN, Near-Field Communication, other types of electromagnetic radiation of a radio frequency wave, light-based communications (including infrared), acoustic communications, and any other type of peer-to-peer technology. For example, a Wi-Fi stick may be plugged in to an air intake controller of the environmental control system, temporarily or permanently, to provide communications between the mobile device 200 and the controller. The communication component 204 of the mobile device 200 may also utilize wired technology for communication, such as transmission of data over a physical conduit, e.g., an electrical cable or optical fiber cable. For one example, an air flow sensor may communicate directly with the mobile device 200 wirelessly or via a wired connection. For another example, the air flow sensor may connect with the controller via a wired connection, and the controller may forward communications The one or more processors 206 may execute code and process data received at other components of the mobile device 200, such as information received at the communication component 204 or stored at the memory component 208. The code associated with the floor selection system 100 and stored by the memory component 208 may include, but is not limited to, operating systems, applications, modules, drivers, and the like. An operating system includes executable code that controls basic functions of the mobile device 200, such as interactions among the various components of the mobile device, communication with external devices via the communication component 204, and storage and retrieval of code and data to and from the memory component 208. Each application includes executable code to provide specific functionality for the processor 206 and/or remaining components of the mobile device 200. Examples of applications executable by the processor 206 include, but are not limited to, a commissioning module 210 for managing general operations of the mobile device, including the communication component and user interface, to commission fresh air intake control, and an air flow module 212 for generating tables for air flow for a targeted air intake controller. Data is information that may be referenced and/or manipulated by an operating system or application for performing functions of the mobile device 200. Examples of data associated with the fresh air intake control and stored by the memory component 208 may include, but are not limited to, incoming data 214 collected from the fan, damper, and air flow sensor (such as fan speed, damper position, and air measurement, and interim tables 216 generated by the processor 206 as air flow values are correlated with damper positions and fan speeds.

The mobile device 200 may further comprise one or more input components 218 and one or more output components 220. A user interface 222 of the mobile device 200 may include portions of the input and output components 218, 220 and be used to interact with a user of the mobile device. For example, the user interface 222 may include a combination of hardware and software to provide a user with a desired user experience, such as an intuitive visualization and transparency for the commissioning process. The input and output components 218 and 220 may include sensor components to manage communications and processing with the proximal environment of the mobile device 200. Examples of sensor components of the input components 218 include, but are not limited to, a motion sensor 224, an image sensor 226, a location sensor 228 (such as a global positioning system sensor), air measurement sensor 230, a temperature sensor, an air quality sensor, and the like. Examples of the output components 220 include, but are not limited to, a display 232 (with or without a touchscreen), a visual indicator 234, an audio speaker 236, a motion generator 238, and the like.

The mobile device 200 may further comprise a power source, such as a power supply or a portable battery, for providing power to the other device components of the mobile device 200.

It is to be understood that FIG. 2 is provided for illustrative purposes only to represent examples of the internal components of the mobile device 200 and is not intended to be a complete diagram of the various components that may be utilized by the device. Therefore, the mobile device 200 may include various other components not shown in FIG. 2, may include a combination of two or more components, or a division of a particular component into two or more separate components, and still be within the scope of the present invention.

Referring to FIGS. 3A-3D, there are shown front views 300-306 of the mobile device 200 of FIG. 2 in example implementations. The mobile device 200 includes a mobile app configuration tool to provide various environmental control functions such as parametrization, air-balancing, system startup, wiring check-up, and commissioning. Example components of the mobile app configuration tool include, but are not limited to, the commissioning module 210 and the air flow module 212.

Figure 3A:
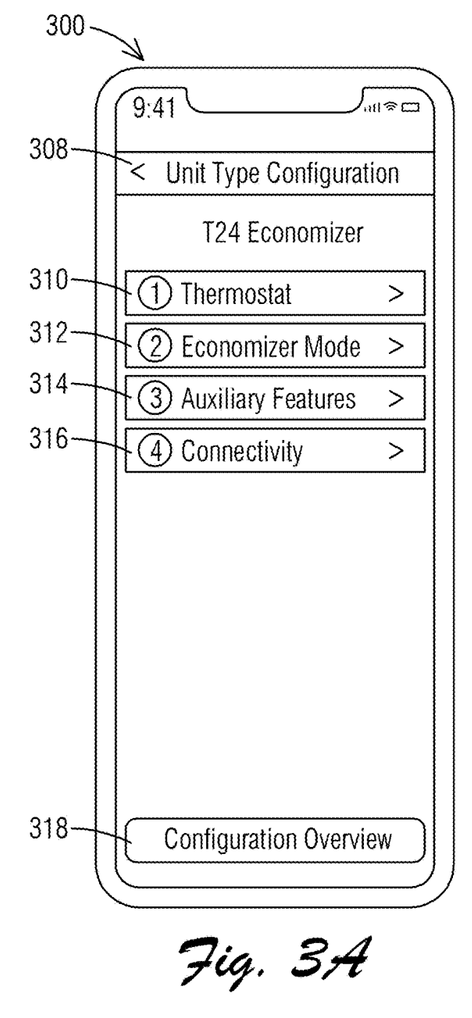
FIGS. 3A-3D are front planar views of a display of the mobile device of FIG. 2 in example implementations.

FIG. 3A represents a unit type configuration screen 308 viewable at a touchscreen display of the mobile device 200 for selecting one or more environmental control functions. The unit type configuration screen 308 may provide specific functions associated with a particular device of the environmental control system, such as a controller (for example, "T24 Economizer"). Examples of the options selectable at the general menu include, but are not limited to, a thermostat function 310, an economizer mode 312, auxiliary features 314, and a connectivity function 316. The unit type configuration screen 308 may further provide an option 318 to move back to a higher level screen of the mobile app configuration tool such as a configuration overview.

Figure 3B:
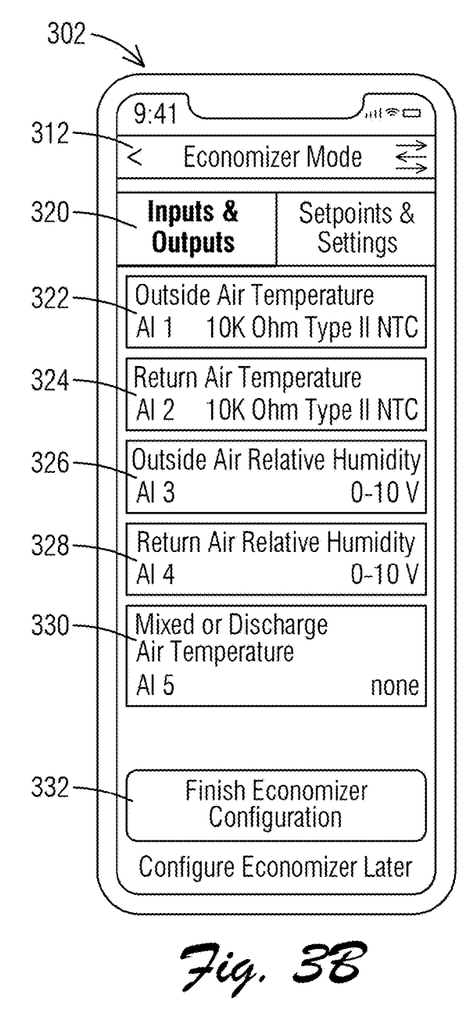

FIG. 3B illustrates a front view 302 of the mobile device 200 for an input and output screen 320 of the economizer mode 312. The input and output screen 320 may indicate certain input and output conditions, such as temperature and humidity. For example, the input and output screen 320 may show sensed readings from system sensors by indicating one or more of the following conditions: outside air temperature 322, return air temperature 324, outside air relative humidity 326, return air relative humidity 328, and mixed or discharge air temperature 330. Upon completion of configuration viewing and/or setting for the input and output screen 320 (as well as the setpoints and settings screen 334 described below), a completion button 332 may be selected to return to the unit type configuration screen 308 or higher level screen of the mobile app configuration tool.

Figure 3C:
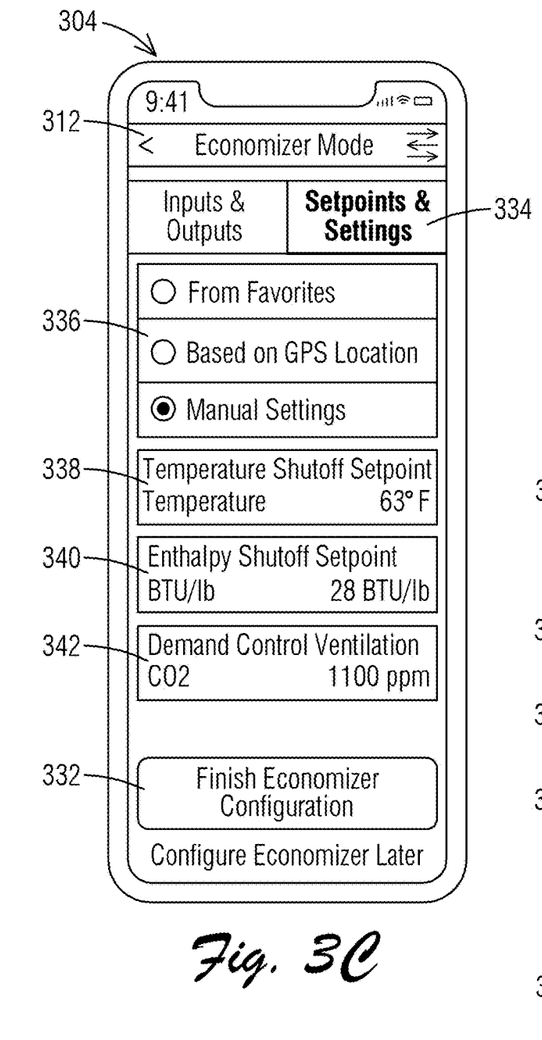

FIG. 3C illustrates a front view 304 of the mobile device 200 for a first portion of a setpoints and settings screen 334 of the economizer mode 312. The setpoints and settings screen 334 may indicate and/or allow the setting of certain conditions, such as setpoints and ventilation settings. Setpoints and settings may be determined in a variety of ways, such as predetermined settings, settings based on a system location, or manual settings by a technician. Examples of setpoints and settings include, but are not limited to, temperature shutoff setpoint 338, enthalpy shutoff setpoint 340, and demand control ventilation 342 (as well as the damper minimum position 344 described below).

Figure 3D:
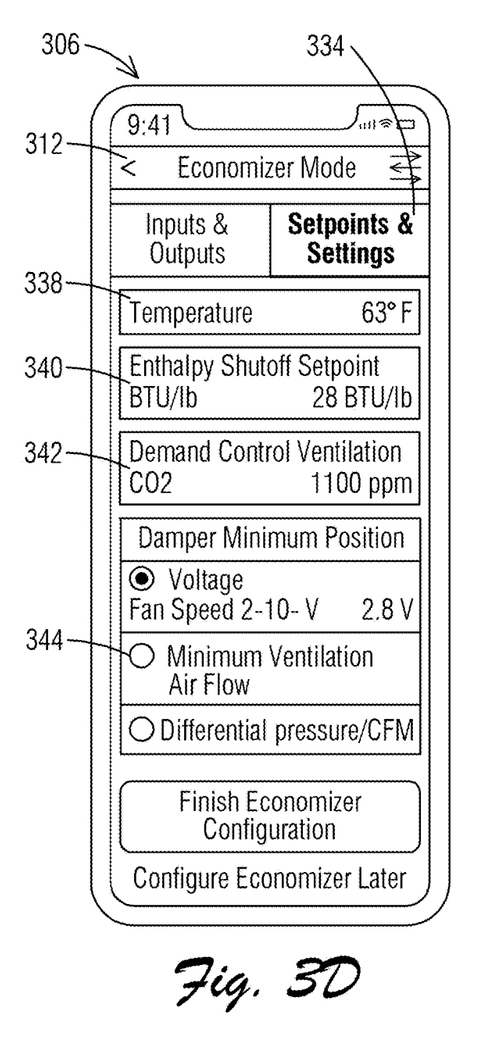

FIG. 3D illustrates a front view 306 of the mobile device 200 for a second portion of the setpoints and settings screen 334 of the economizer mode 312. The second portion of the setpoints and settings screen 334 is continuation of the first portion shown in FIG. 3C and may be revealed by manipulating the user interface 222 of the mobile device 200. For example, the touchscreen of the display may be scrolled downward to reveal one or more additional sections, such as the damper minimum position 344 of the setpoints and settings screen 334. The damper minimum position 344 may be based on the fan speed voltage for some embodiments, the damper minimum position may be based on the minimum ventilation air flow for other embodiments, and the damper minimum position may be based on the differential pressure/CFM for yet other embodiments.

Figure 4:
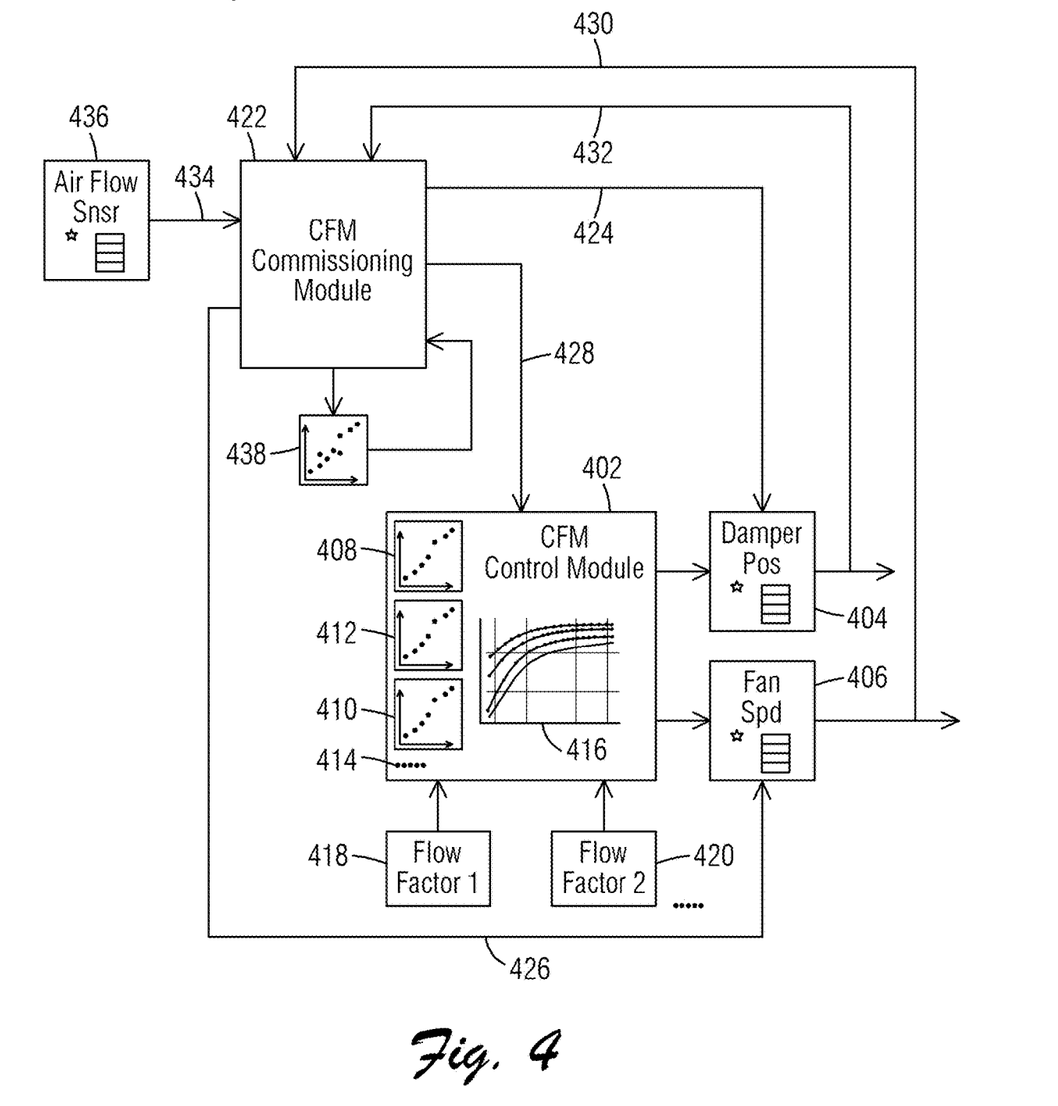
FIG. 4 is an illustration of an environment in an example implementation that is operable to employ techniques described herein.

Referring to FIG. 4, there is shown an illustration of an environment 400 in an example implementation. The environmental control system includes a controller 402, such as an air intake controller or a CFM control module, to control the HVAC components of the system. The controller 402 includes one or more communication components communicating other entities via a wired and/or wireless network, one or more processors, and one or more memory components. The controller 402 may communicate via the communication components, and thus control via the processor(s), the damper position components 404 of the dampers and the fan speed component 406 of the fan. For example, the controller 402 may control a damper actuator to modulate the damper position and provide an analog output to a fan speed driver, such as a variable frequency drive, to modulate the fan speed. The controller 402 may also receive feedback signals from the damper position components 404 and the fan speed component 406 (not shown in FIG. 4).

The memory component of the controller 402 may store data such as air flow tables 408-414. For some configurations, the air flow tables may include a first air flow table 408 representing air flow values correlated with damper positions for a first fan speed, a second air flow table 410 representing air flow values correlated with damper positions for a second fan speed, a third air flow table 412 representing air flow values correlated with damper positions for a third fan speed, and a fourth air flow table 414 representing air flow values correlated with damper positions for a fourth fan speed. For example, the first fan speed may be 100%, the second fan speed may be 75%, the third fan speed may be 50%, and the fourth fan speed may be 25%. For other embodiments, the air flow tables may be stored in the memory component of the controller 402 in other forms so long as the information represents the graphic view 416 shown in FIG. 4. The graphic view 416 shows damper positions demarcated by the values of the x-axis and air flow values (or, in the alternative, CFM or % OA value) demarcated by the values of the y-axis. Line representations as shown in the graphic view 416 in which each line representation depicts a different fan speed, such as 100%, 75%, 50%, and 25%. The number of air flow values and corresponding damper positions is not limited but a particular range of values are sufficient for an appropriate performance and power consumption balance. For example, each table may represent sixteen evenly-spaced values damper positions, starting with a fully closed or open position, and a corresponding air flow value for each damper position.

During operation, the controller 402 may modify operations based on the air flow tables 408-414, based on other factors that may impact air flow. Filter condition may have a significant impact air flow. For this reason, flow factors 418, 420 may be introduced to the controller 402 to compensate for degradation of filter condition. For example, flow factor 1 (418) may represent a first coefficient of "1" when a brand new filter is installed at the system, and flow factor 2 (420) may represent a second coefficient less than the first coefficient, such as 0.90 or 0.95. Each flow factor 418, 420 may be based on time, whether brand new or time elapsed since installation, or other factors, such as signals generated by a differential pressure sensor, to determine filter condition.

A mobile device or other type of commissioning device 422 may be used to generate tables 408-414 for air flow. The mobile device 422 may control actuators of the dampers and a driver of the fan directly via direct lines 424, 426 or indirectly via control line(s) 428. In this manner, the mobile device 422 may drive air flow of the environmental control system while generating the tables 408-414 and otherwise commissioning the system. The mobile device 422 also receives actuator and driver feedback signals 430, 432, from the damper actuator and fan driver to confirm actual damper positions and fan speeds. The mobile device 422 may further acquire air measurements 434 from an air flow sensor 436. The mobile device may manage air flow by controlling various air flow factors such as fan speed and damper position. Although an air flow sensor 436 may be permanently installed, some embodiments provide the air flow sensor temporarily to minimize cost because it is primarily or solely used during commissioning. For some embodiments, the air flow sensor 436 may be temporarily installed by physically positioning a sensing portion of the sensor at a compartment of the environmental control system and connecting the air flow sensor to the controller 402 for delivery of an analog or digital signal. A Wi-Fi component of the controller 402, whether integrated or plugged-in, may communicate the air measurements to the mobile device 422. For some embodiments, also positioning the sensing portion in the compartment, the air flow sensor 436 may communicate directly and wirelessly with the mobile device 422.

The mobile device 422 executes the process for generating each air flow tables 408-414 by identifying and correlating air flow values with each damper position. Thus, the mobile device 422 creates an interim table 438 or similar format for storing interim values while each air flow table is being generated. Once finished and an air flow table 408-414 is complete, then the mobile device 422 is ready to transfer the completed table to the memory component of the controller 402. After commissioning, the mobile device 422 and the air flow sensor 436 may be disconnected or otherwise removed from the environmental control system, and the feedback loops for the damper position components 404 and fan speed component 406 may be fed back to controller 402.

Figure 5:
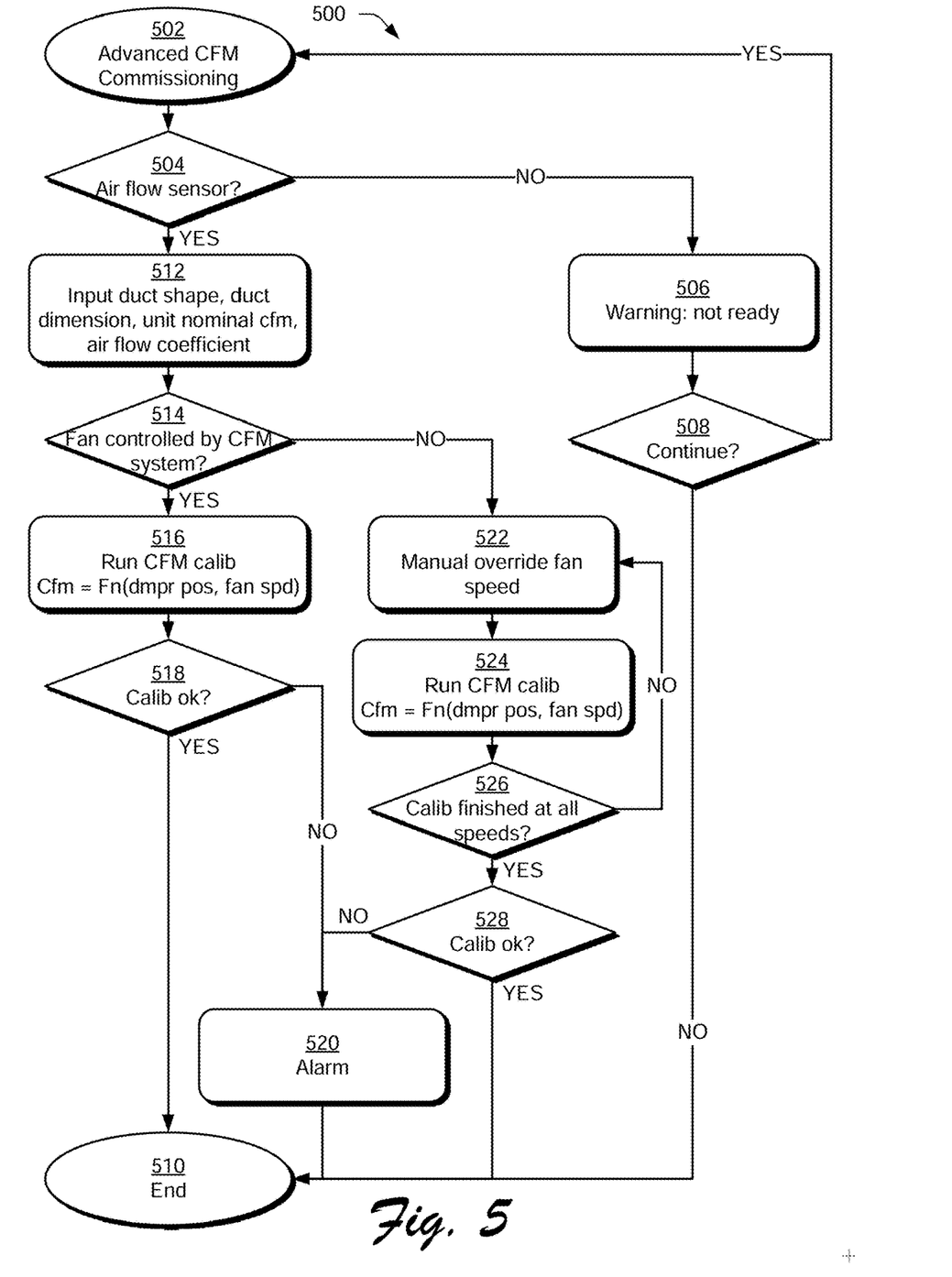
FIG. 5 depicts an operation of the mobile device of FIG. 4 in an example implementation.

Referring to FIG. 5, there is depicted a commissioning operation 500 of the mobile device of FIG. 4 in an example implementation. The commissioning operation 500 may be initiated at the beginning of the process (502) by an activation at the user interface 222 of the mobile device 200, a connections or incoming signal to the communication component 204 or the input component 218 of the mobile device, a connection or outgoing signal from the output component 220 of the mobile device, or a sensed condition of an input component of the mobile device. For example, a connection to or communication with the air flow sensor 436 or the controller 402 may initiate the commissioning operation 500.

The commissioning operation 500 determines whether an air flow sensor 436 is detected and ready for operation (504). For example, the air flow sensor 436 may be temporarily installed and, as a result, the mobile device 422 may receive a ready signal from the air flow sensor. If an air flow sensor 436 is not detected or otherwise no ready for operation, then the mobile device may provide a visual and/or audio alarm to a user of the mobile device, such as a technician (506). Thereafter, the mobile device 422 may query the user at the user interface whether to continue with the commissioning process (508). A positive response at the user interface returns the mobile device 422 to at point of the commissioning operation 500 at or before the air flow sensor detection (504). A non-positive response at the user interface terminates the commissioning operation 500 (510) since an operational air flow sensor is necessary in order to continue with the commissioning operation.

In response to detecting an operational air flow sensor 436 (504), the mobile device 422 may identify certain information that may be needed (512) in order to convert the air measurements of the air flow sensor to an appropriate air flow value. The information may be stored at the memory component 208, received from another device via the communications component 204, or received from the user via the user interface 222. For commissioning, the air flow sensor 436 is placed in a compartment of the environmental control system, such as behind an outside air damper, and the air flow sensor detects an air measurement based on the condition of the compartment. For some embodiments, the air flow sensor 436 detects the air measurement in the form of air velocity. In order to convert an air velocity value to an air flow value, the air velocity value is multiplied by a duct dimension since air flow values are in terms of cubic feet per minute (CFM). For some embodiments, the air flow sensor 436 detects the air measurement in the form of differential pressure. An air flow value may be determined from a differential pressure value based on the square root of the differential pressure value, the flow coefficient, and a duct dimension of the environmental control system. The flow coefficient may be provided by a damper manufacturer and, as explained above, be identified by the mobile device 422 in various ways based on manufacturer and/or model. Also, the flow coefficient may be calibrated automatically based on unit runtime and maintenance events. The duct dimension is again used to determine the corresponding air flow value since air flow is based on a cross section area of a duct multiplied by air velocity. Unit nominal CFM is not necessary information but may enhance the operation of the environmental control system, such as managing a minimum CFM to be 20% so at least 20% of the air flow needs will be fresh intake air.

In response to identifying certain information such as a duct dimension (512), the mobile device 422 may determine whether the fan of the HVAC is controlled by the controller 402 or the mobile device automatically or manually (i.e., manual override) by "relay logic" (514). The mobile device 422 generates air flow tables based on air measurements provided by the air flow sensor, fan speeds associated with the environmental control system, and damper positions associated with the environmental control system (516) in response to determining that the fan is controller by the controller 402 or the mobile device automatically.

When generating the air flow tables 408-414 (516), the mobile device 422 determines the air flow values (in terms of CFM) as a function of damper position and fan speed, thus building the air flow tables. As stated above, the air flow is based on air velocity and the duct dimension (such as, duct area). For a first round of generating the tables (516) in which a first air flow table is generated, the fan is operated at a first fan speed and the damper position is changed either in descending or ascending order. Then, air flow values are determined based on air measurements by the air flow sensor 436 for the damper positions (and stored at an interim table 438) until air flow readings become unreliable or the minimum coverage is achieved. The first air flow table 408 associated with the first fan speed is stored at a memory component of the controller 402. For a next round of generating the tables (516) in which a next air flow table 410, 412 or 414 is generated, the fan is operated at a next fan speed different from the first fan speed and the air flow values are again determined. The process of generating the air flow tables 408-414 (516) is repeated for different fan speeds until at least a minimum number of rounds of commissioning have been completed. The first air flow table 408 and any subsequent tables 410, 412, or 414 may be sent to the controller 402 separately in response to being generated or validate, or the first air flow table and any subsequent tables may be sent to the controller together after all tables have been generated or validated.

Each air flow table or all air flow tables 408-414 may be validated (518) in response to generating them (516). Since the damper position is adjusted sequentially, i.e., descending or ascending order, the air flow values for any particular table should also be established in descending or ascending order. For a table having sixteen damper points from 100% to 0% and the validity of the air measurements and/or air flow values are checked. For example, a damper point of 50% must be a value less than a damper point of 60%. Also, a predetermined time period for moving from 100% to 94% (such as, 10 seconds) may be used to check whether the corresponding measurement or value decreases after the predetermined time period (such as after 10 seconds). Thereafter, the operation 500 for commissioning may terminate (510) in response to establishing the validity of the tables or values (518). If the tables or values are not considered to be valid (518), then the mobile device 422 may provide an audio and/or visual alarm (520) before terminating (510).

Referring back to determining whether the fan is controlled automatically or manually (514), a manually-controlled fan may require a technician to operate the fan during the generation of the air flow tables. Thus, the technician selects a first fan speed following instructions from the user interface of the mobile device 422 (522) and, in response thereto, the mobile device determines the air flow values in relation to damper positions to generate the first air flow table 408 (524). The mobile device 422 then repeats this process of having the technician manually select the fan speed (522) and generating the next air flow table 410, 412, or 414 (524) until all air flow tables are generated (526), such as one table for each fan speed. In response to completing the generation of tables, each air flow table or all air flow tables 408-414 may be validated (528). Thereafter, the operation 500 for commissioning may terminate (510) in response to establishing the validity of the tables or values (528). If the tables or values are not considered to be valid (528), then the mobile device 422 may provide an audio and/or visual alarm (520) before terminating (510).

After commissioning, the mobile device 422 may be detached from the air intake controller 402 and the air flow sensor 436 may be removed. The controller 402 may execute accurate air flow control independently based on the open-loop tables 408-414 stored during commissioning.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A mobile device for commissioning air intake control of an environmental control system comprising:
    a user interface configured to identify a duct dimension associated with an air intake controller of the environmental control system;
    a communication component configured to receive a plurality of air measurements from an air flow sensor, the air flow sensor being positioned in a duct compartment of the environmental control system; and
    a processor configured to generate a plurality of air flow tables including a plurality of air flow values based on the plurality of air measurements, the duct dimension, a plurality of fan speeds associated with the environmental control system, and a plurality of damper positions associated with the environmental control system, the processor generating a particular air flow table of the plurality of air flow tables for each fan speed of the plurality of fan speeds,
    wherein the communication component causes airflow of the environmental control system during commissioning by transmitting a particular fan speed of the plurality of fan speeds and the plurality of damper positions to the air intake controller of the environmental control system, and
    wherein the communication component enables airflow control of the environmental control system subsequent to commissioning by transmitting the plurality of air flow tables to the air intake controller of the environmental control system.

2. The mobile device as described in claim 1, wherein the communication component connects wirelessly to the air intake controller before generating the plurality of air flow tables and disconnects wirelessly from the air intake controller after transmitting the plurality of air flow tables to the air intake controller.

3. The mobile device as described in claim 1, wherein the air measurements are one of air velocity measurements of the duct compartment or differential pressure measurements of the duct compartment.

4. The mobile device as described in claim 1,
    wherein the processor generates each air flow value of the plurality of air flow values after the communication component transmits a corresponding fan speed and in response to the communication component transmitting a corresponding damper position.

5. The mobile device as described in claim 1, wherein:
    each air flow value of the plurality of air flow values is based on a particular air measurement of the plurality of air measurements; and each air flow value of the plurality of air flow values is correlated with a corresponding fan speed of the corresponding air flow table and a corresponding damper position of the plurality of damper positions.

6. The mobile device as described in claim 5, further comprising confirming that the air flow values for at least one air flow table of the plurality of air flow tables are valid.

7. A method for commissioning air intake control of an environmental control system, the method comprising:
identifying, by a user interface of a mobile device, a duct dimension associated with an air intake controller of the environmental control system;
receiving, by a communication component of the mobile device, a plurality of air measurements from an air flow sensor positioned in a duct compartment of the environmental control system;
generating, by the processor, a plurality of air flow tables including a plurality of air flow values based on the plurality of air measurements, the duct dimension, a plurality of fan speeds associated with the environmental control system, and a plurality of damper positions associated with the environmental control system, generating the plurality of air flow tables including generating a particular air flow table of the plurality of air flow tables for each fan speed of the plurality of fan speeds;
causing, by the communication component, airflow of the environmental control system during commissioning by transmitting a particular fan speed of the plurality of fan speeds and the plurality of damper positions to the air intake controller of the environmental control system; and
enabling, by the communication component, airflow control of the environmental control system subsequent to commissioning by transmitting the plurality of air flow tables to the air intake controller of the environmental control system.

8. The method as described in claim 7, further comprising:
connecting wirelessly to the air intake controller before generating the plurality of air flow tables; and
disconnecting wirelessly from the air intake controller after transmitting the plurality of air flow tables to the air intake controller.

9. The method as described in claim 7, wherein the air measurements are one of air velocity measurements of the duct compartment or differential pressure measurements of the duct compartment.

10. The method as described in claim 7, wherein generating each air flow table comprises
generating each air flow value of the plurality of air flow values after transmitting a corresponding fan speed and in response to transmitting a corresponding damper position.

11. The method as described in claim 10, wherein:
each air flow value of the plurality of air flow values is based on a particular air measurement of the plurality of air measurements; and
each air flow value of the plurality of air flow values is correlated with corresponding fan speed of the corresponding air flow table and a corresponding damper position of the plurality of damper positions.

12. The method as described in claim 7, further comprising confirming that the air flow values for at least one air flow table of the plurality of air flow tables are valid.

13. A non-transitory computer readable medium including executable instructions which, when executed, causes at least one processor to commission air intake control of an environmental control system by:
identifying, by a user interface of a mobile device, a duct dimension associated with an air intake controller of the environmental control system;
receiving, by a communication component of the mobile device, a plurality of air measurements from an air flow sensor positioned in a duct compartment of the environmental control system;
generating, by the processor, a plurality of air flow tables including a plurality of air flow values based on the plurality of air measurements, the duct dimension, a plurality of fan speeds associated with the environmental control system, and a plurality of damper positions associated with the environmental control system, generating the plurality of air flow tables including generating a particular air flow table of the plurality of air flow tables for each fan speed of the plurality of fan speeds;
causing, by the communication component, airflow of the environmental control system during commissioning by transmitting a particular fan speed of the plurality of fan speeds and the plurality of damper positions to the air intake controller of the environmental control system; and
enabling, by the communication component, airflow control of the environmental control system subsequent to commissioning by transmitting the plurality of air flow tables to the air intake controller of the environmental control system.

14. The medium as described in claim 13, further comprising:
connecting wirelessly to the air intake controller before generating the plurality of air flow tables; and
disconnecting wirelessly from the air intake controller after transmitting the plurality of air flow tables to the air intake controller.

15. The medium as described in claim 13, wherein the air measurements are one of air velocity measurements of the duct compartment or differential pressure measurements of the duct compartment.

16. The medium as described in claim 13, wherein generating each air flow table comprises
generating each air flow value of the plurality of air flow values after transmitting a corresponding fan speed and in response to transmitting a corresponding damper position.

17. The medium as described in claim 16, wherein
each air flow value of the plurality of air flow values is based on a particular air measurement of the plurality of air measurements; and
each air flow value of the plurality of air flow values is correlated with corresponding fan speed of the corresponding air flow table and a corresponding damper position of the plurality of damper positions.

* * * * *